United States Patent
Thornburg et al.

(10) Patent No.: US 9,571,901 B2
(45) Date of Patent: Feb. 14, 2017

(54) SYNCHRONIZING AUDIO AND VIDEO FRAMES

(75) Inventors: Christopher A. Thornburg, Chandler, AZ (US); Pranahitha Peddi, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 1725 days.

(21) Appl. No.: 12/006,083

(22) Filed: Dec. 28, 2007

(65) Prior Publication Data

US 2009/0169176 A1 Jul. 2, 2009

(51) Int. Cl.
| | |
|---|---|
| H04N 9/80 | (2006.01) |
| H04N 21/8547 | (2011.01) |
| H04N 21/2368 | (2011.01) |
| H04N 21/43 | (2011.01) |
| H04N 21/434 | (2011.01) |

(52) U.S. Cl.
CPC ...... *H04N 21/8547* (2013.01); *H04N 21/2368* (2013.01); *H04N 21/4307* (2013.01); *H04N 21/4341* (2013.01)

(58) Field of Classification Search
None
See application file for complete search history.

(56) References Cited

U.S. PATENT DOCUMENTS

| | | | | |
|---|---|---|---|---|
| 5,598,352 | A * | 1/1997 | Rosenau et al. | 715/203 |
| 6,262,776 | B1 * | 7/2001 | Griffits | 348/512 |
| 6,337,883 | B1 * | 1/2002 | Tanaka | 375/240.25 |
| 6,339,675 | B1 | 1/2002 | Shimizu et al. | |
| 6,925,250 | B1 * | 8/2005 | Oshima et al. | 386/329 |
| 6,950,604 | B1 * | 9/2005 | Kato et al. | 386/211 |
| 2003/0128294 | A1 * | 7/2003 | Lundblad | H04N 5/04 348/515 |
| 2004/0205214 | A1 * | 10/2004 | Bång et al. | 709/231 |
| 2005/0021811 | A1 * | 1/2005 | Roelens | H04N 21/4307 709/231 |
| 2006/0146185 | A1 * | 7/2006 | Chen | H04N 21/2368 348/410.1 |

FOREIGN PATENT DOCUMENTS

| | | |
|---|---|---|
| EP | 0 920 219 | 6/1999 |
| EP | 1793586 A2 * | 6/2007 |
| WO | 96/19078 | 6/1996 |
| WO | 2005/117431 | 12/2005 |

OTHER PUBLICATIONS

European Patent Office, Combined Search and Written Opinion for European Application No. 08254028.7, dated Jun. 26, 2009, 6 pgs.

* cited by examiner

*Primary Examiner* — Fatoumata Traore
(74) *Attorney, Agent, or Firm* — Trop Pruner & Hu, P.C.

(57) ABSTRACT

Synchronization problems between audio and video information may be reduced by determining whether a certain predetermined time has elapsed since the previous frame of video has been displayed. Thus, for example, where the audio presentation time stamp and video presentation time stamp are offset so that audio information may be presented before video information, the next video frame in the queue may be displayed immediately after the passage of a predetermined time. Then, audio/video synchronization may be achieved after passage of an amount of time determined by the setting of the predetermined elapsed time between frames. The longer the predetermined time between frames, the more slowly the video frames are displayed, but the faster audio and video synchronization is achieved.

21 Claims, 2 Drawing Sheets

SYNCHRONIZING AUDIO AND VIDEO FRAMES

BACKGROUND

This relates generally to presenting audio and video information.

Audio and video information may be presented on output devices using presentation time stamps. A presentation time stamp may be provided for each audio and video frame. Thus, when the current time equals the appropriate presentation time stamp time, a sequence of audio data or video frame may be displayed.

The presentation time stamps are embedded within the encoded content. An audio and a video renderer present the audio and video frames to an output display device at an appropriate time.

DETAILED DESCRIPTION

The synchronization between the presentation of audio and video frames may be important to an enhanced user experience. If the audio and video frames are not synchronized, irregularities may occur. For example, the viewer may see a speaker's lips moving, but may realize that the audio has already been played or has still not been played.

Presentation time stamps are embedded within encoded content called a packetized elementary stream. A presentation time stamp is placed in a packet header to indicate the exact time that a portion of a portion of decoded audio or video data is to be presented to a viewer. The encoded content may be any type of audio and video material, including movies, games, or other graphics. A renderer is any component that decides when either audio or video is sent to an output device. An output device may be a television, a monitor, an audio/video receiver, or a computer display, to mention some examples.

Generally, content contains initial audio and video presentation time stamps close to one another in time. The first video frame is displayed very soon after startup and may be close to the first rendered audio sample, thereby maintaining audio/visual synchronization. The actual times may depend on the content and the software and hardware used.

However, in some cases, the content may not follow this sequence. The content can be encoded so that the first video presentation time stamp comes some amount of time after the first audio presentation time stamp, for example. In such a case, the user hears audio a few seconds before the first video frame. In Internet Protocol streaming, this may cause a channel change time to seem longer than desirable to the end user.

Figure 2:
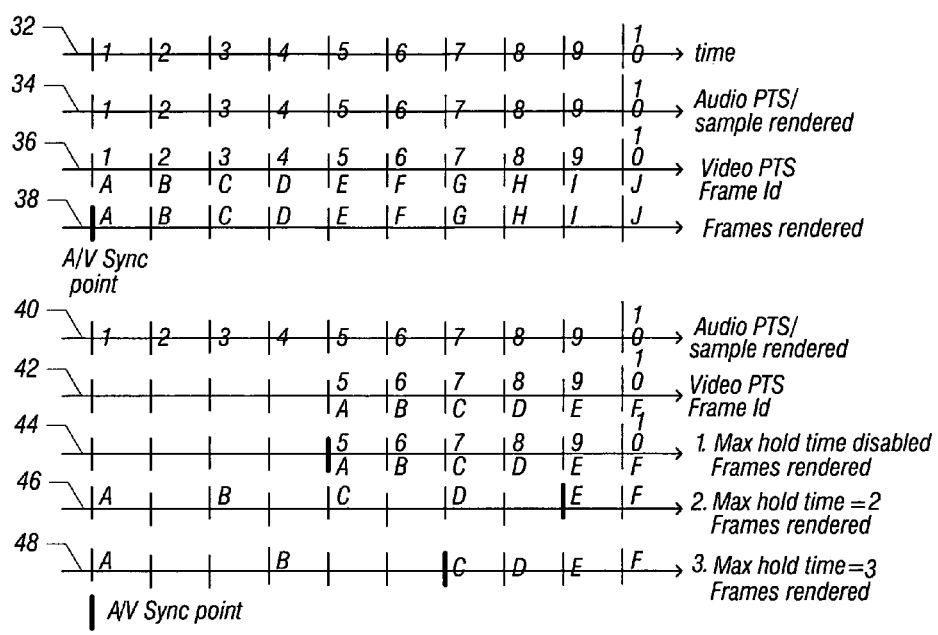
FIG. 2 is a timing diagram for the presentation of video frames and audio data in accordance with some embodiments.

Thus, referring to FIG. 2, the line 32 shows increasing units of time. The line 34 shows an audio presentation time stamp and indicates when the sample is rendered in one embodiment. The line 36 shows a video presentation time stamp and frame identifier which are synchronized with each unit of time and with the audio presentation time stamp. The audio/video synchronization point (A/V sync point), indicated in line 38, is immediate and each frame thereafter has synchronization between audio and video.

In another embodiment, line 40 shows an audio presentation time stamp and the time when the audio sample is rendered which, in this case, corresponds to each unit of time. Line 42 shows the video presentation time stamp and the frame identifier, and, in this case, the first video presentation time stamp does not occur until time unit 5.

Thus, if the presentation time stamps were strictly followed, the audio would begin before the video. As shown in line 44, the audio/video (A/V) synchronization (sync) point does not occur until time unit 5, and after that there is audio and video synchronization in this example. For the time units 1-4, there would be audio but no video in this example, which may be an undesired user experience.

Figure 1:
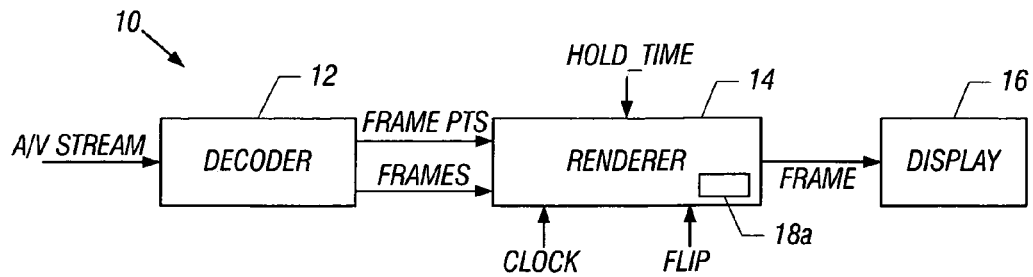
FIG. 1 is a system depiction for one embodiment of the present invention.

Referring to FIG. 1, an audio video presentation system 10 may receive an audio/video (A/V) stream at a decoder 12. In one embodiment, the system is a consumer electronics device implemented using a system on a chip. The decoder 12 decodes any encoding or compression of a sequence of frames and provides a frame presentation time stamp and frames to a renderer 14. The decoder 12 may remove headers from packets in the stream and extract audio and video presentation time stamps. The decoder 12 may also remove audio and video frames from the stream.

The renderer 14 may receive a clock signal, a flip signal, and a hold_time signal as indicated. The renderer 14 provides a frame to an output device 16 which may be an audio/video display device. Thus, the audio/video display device may be a computer, a television, or a cellular telephone, to mention a few examples.

The system 10 may comprise a computer system, an appliance, a work station, a terminal, a handheld device, a personal digital assistant, a television, a set top box, a telephone, a handset, a wireless access point, or a subscriber station, to mention a few examples. The system 10 may be a media processing system to communicate or process different types of information, such as media information and control information. Examples of media information may include any data or signals representing content meant for a user, such as media content, voice information, video information, audio information, image information, textual information, etc. Control information may refer to any data or signals representing commands, instructions, or control words meant for an audio system.

In some embodiments, the system 10 may be implemented as a wired communication system, a wireless communication system, or a combination of the two. The source of the audio video stream may comprise any media source capable of sourcing or delivering media information or control information. This information may be provided to a large number of nodes, only one of which is shown in FIG. 1. The media source may be any hardware or software element capable of storing and/or delivering media information. The information may provide streaming information as indicated in some embodiments. It may also provide broadcast information or digital audio video signals.

The maximum hold time (hold_time) is introduced by the renderer 14 to handle audio and video content. The maximum hold time may be programmed by a distributor, fixed based on content analysis, or adjusted dynamically by the system, to mention a few examples. In one embodiment, the maximum hold time is configurable. By configurable, it is intended to refer to the ability to set or change the maximum hold time after the system has been manufactured. As one example, the hold_time may be set by a system integrator. The maximum hold time is the maximum time for which a frame is held on a display before a new frame is flipped in its place, assuming uncompressed video frames are available in the renderer 14. The maximum hold time may also be understood as the maximum time allowed between two consecutive frame flips to the display 16.

A dynamically configurable system, in one embodiment, may set the hold_time variable based on various characteristics of an A/V stream, the current time, or the state of the system. One such characteristic is the time between a video frame and an audio frame that includes the audio that goes with the video frame. In one embodiment, the larger the time between the video and audio frame, the greater the hold_time. Using a characteristic of the stream or the content, the hold_time may be configured automatically based on the nature of the A/V stream. The hold_time may also be set based on the type of system 10. In another embodiment, the hold_time may be calculated based on the difference between the current time and the next presentation time stamp. For example, the larger the difference between the next video presentation time stamp and the current time, the greater the hold time. In yet another embodiment, the hold_time may be calculated based on the amount of audio or video data currently buffered within the system.

On start up, the first video frame is sent by the renderer 14 to the display 16 right away. If no frame is flipped within a maximum hold time after the previous frame flip, the next frame in the stream is sent to the display 16. If frames were flipped in the interim, the previous flip time is updated and the renderer 14 waits for the hold time from that flip time.

Thus, referring again to FIG. 2, line 46, in this example, with a maximum hold time equal 2, the frames A, B, C, D, and E are displayed, separated by two time units. Audio/video synchronization is not achieved until the time E. However, frames are displayed from the start and, after the time E, audio and video synchronization is achieved.

Video is presented to the display right away, along with the audio, giving the impression to the user of a faster startup or channel change, in some embodiments. Audio/video synchronization may not be obtained initially and the video may be displayed in slow motion until audio/video synchronization is achieved. The actual time before achieving audio/video synchronization depends on the maximum hold time and the difference between the initial audio and video presentation time stamps.

As also shown in FIG. 2, in line 48, with a maximum hold time equal to 3, the frames are displayed three time units apart and audio/video synchronization is achieved at time 7 with frame C. Note that the synchronization between the audio and video information is achieved earlier with the longer maximum hold time. However, the video may be played slower prior to synchronization.

The maximum hold time may be greater than one frame interval for audio/video synchronization to be achieved. For example, for 30 frames-per-second content, the maximum hold time may be greater than 0.033 seconds.

The maximum hold time may also let the video renderer 14 recover from abnormally large presentation time stamps received in the middle of content playback. Instead of causing video freezes, the renderer 14 may only stall for the hold time after the previous flip.

The use of the maximum hold time may provide the user with the impression of a faster channel change because video may be presented to the display as soon as it is decoded by the decoder 12. It may also increase the robustness of the video renderer and may allow it to deal with content where the video presentation time stamps are much ahead compared to the audio presentation time stamps. The renderer 14 then has a mechanism to recover from frames with presentation time stamps far in the future, for example, because of errors, instead of causing video freeze in some embodiments.

Figure 3:
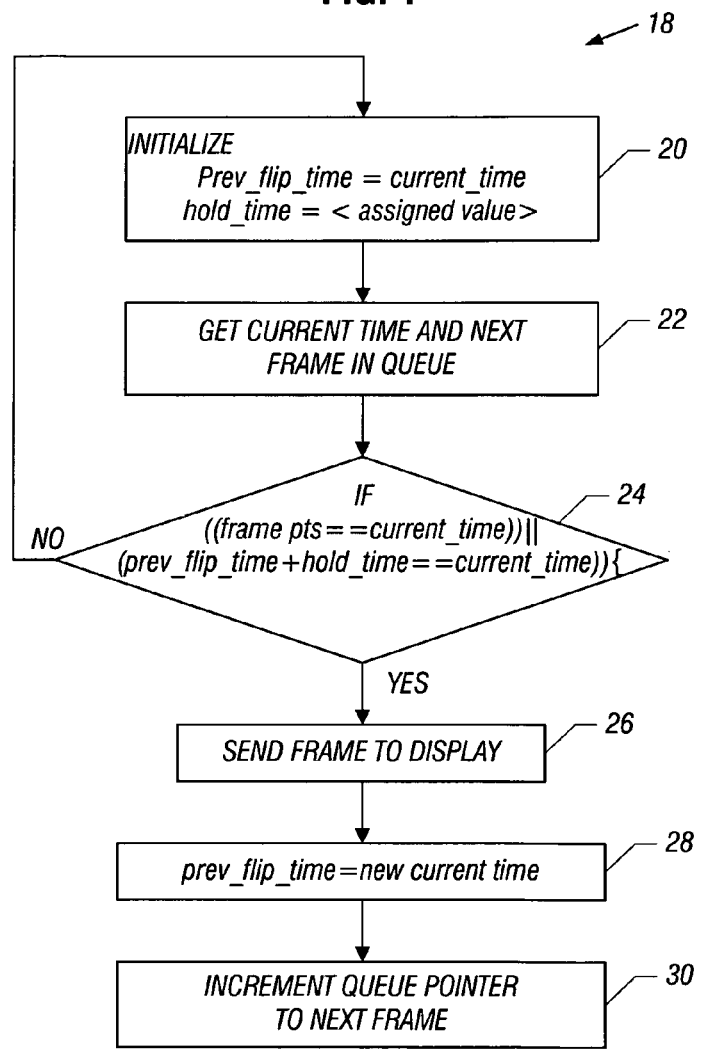
FIG. 3 is a flow chart for a sequence for synchronizing audio data and video frames in accordance with some embodiments.

Referring to FIG. 3, a sequence 18 may be implemented in software, hardware, or firmware. In the case of software, it may be stored on a storage device 18a within the renderer 14 in one embodiment. It may also be stored outside the renderer 14, in some embodiments, and may be stored in any semiconductor memory, for example. In some embodiments of the present invention, the renderer 14 is a processor-based system such as a controller.

At block 20, the system is initialized. The variable prev_flip_time is set equal to the variable current_time which is simply the current time. The variable hold_time is set equal to an assigned value in one embodiment. The assigned value may be assigned by the user, may be preset by the manufacturer, and may be deduced from operator controls. For example, a signal may be provided with the audio/video stream which tells the renderer 14 what is the assigned value. Alternatively, the system can detect the offset between audio and video presentation time stamps and assess the best hold time to use under the circumstances.

Once the system is initialized, the current time and the next frame in the queue are obtained, as indicated in block 22. Thus, the current time may be obtained from a clock and the next frame in the queue is received from the decoder 12 (as indicated in FIG. 1).

At diamond 24, a check determines whether the frame presentation time stamp equals the current time or the variable prev_flip_time plus the hold_time equals the current time. In either of these circumstances, a frame is sent to the display 16 by the renderer 14. Thus, if the presentation time stamp calls for display, the display occurs. If the presentation time stamp still does not call for the display of the video frame, then a check determines whether the hold time has passed since the last frame display or frame flip. If so, the frame is displayed in either case (block 26). After displaying the frame in block 16, the variable prev_flip_time is set equal to the new current time, in block 28, and the queue pointer is incremented to point to the next frame (block 30).

The storage device 18a may be implemented using any machine readable or computer readable media capable of storing data, including both volatile and non-volatile memory. For example, the storage device 18a may include read only memory, random access memory, dynamic random access memory, double data rate dynamic random access memory, synchronous dynamic random access memory, static random access memory, programmable read only memory, erasable programmable read only memory, electrically erasable programmable read only memory, flash memory, polymer memory, ovonic memory, phase change or ferroelectric memory, or any other type of media suitable for storing information. All or part of the storage device 18a may be included on the same integrated circuit as the renderer 14 or, alternatively, some portion or all of the storage device 18a may be disposed on an integrated circuit or other medium, for example a hard disk drive, that is external to the integrated circuit of the renderer 14. The embodiments are not limited in this context.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
synchronizing audio and video at a time determined based on both a time between audio and video initial time stamps and a hold time equal to a maximum time allowed between two consecutive frame flips to a display; and
dynamically setting the hold time based on a difference between a current time and a next presentation time stamp, wherein dynamically setting the hold further comprises:
setting a prev flip time to said current time;
obtaining said current time and a next frame from a decoder;
determining whether a frame initial presentation time stamp equals said prev flip time plus said hold time equals said current time,
If yes displaying said frame, if no
determining whether said hold time has passed since a last frame display or frame flip, If so, displaying said frame;
setting said prev flip time to a new current time;
incrementing a queue pointer to point to a new next frame.

2. The method of claim 1 including enabling the hold time to be configured.

3. The method of claim 2 enabling the hold time to be dynamically configured.

4. The method of claim 1 including preventing a predetermined time period from being exceeded between display of successive frames.

5. The method of claim 1 including making said hold time greater than one frame interval.

6. The method of claim 1 including receiving an audio/video packetized stream, removing a header from said stream, and obtaining presentation time stamps from said header and frames from said stream.

7. A non-transitory computer readable medium storing instructions that may be executed by a computer to:
synchronize audio and video at a time determined based on both a time between audio and video initial time stamps and a hold time equal to a maximum time allowed between two consecutive frame flips to a display; and
dynamically setting the hold time based on a difference between a current time and a next presentation time stamp, wherein dynamically setting the hold further comprises:
setting a prev flip time to said current time;
obtaining said current time and a next frame from a decoder;
determining whether a frame initial presentation time stamp equals said prev flip time plus said hold time equals said current time,
If yes displaying said frame, if no
determining whether said hold time has passed since a last frame display or frame flip, If so, displaying said frame;
setting said prev flip time to a new current time;
incrementing a queue pointer to point to a new next frame.

8. The medium of claim 7 further storing instructions to enable the hold time to be configured.

9. The medium of claim 7 further storing instructions to enable the hold time to be configured dynamically.

10. The medium of claim 9 further storing instructions to set the hold time based on the time between a video frame and an audio frame having the audio for that video frame.

11. The medium of claim 7 further storing instructions to prevent a predetermined time period from being exceeded between display of successive frames.

12. The medium of claim 7 further storing instructions to receive an audio/video packetized stream, remove a header from said stream, and obtain presentation time stamps from said header and frames from said stream.

13. The medium of claim 7 further storing instructions to provide said presentation time stamps and said frames to a renderer together with an indication of time and an indication of said hold time.

14. An apparatus comprising:
a decoder; and
a renderer coupled to said decoder to synchronize audio and video at a time determined based on both a time between audio and video initial time stamps and a hold time equal to a maximum time allowed between two consecutive frame flips to a display; and
dynamically set the hold time based on a difference between a current time and a next presentation time stamp, wherein dynamically set the hold time further comprises:
set a prev flip time to said current time;
obtain said current time and a next frame from said decoder;
determine whether a frame initial presentation time stamp equals said prev flip time plus said hold time equals said current time,
If yes display said frame, if no
determine whether said hold time has passed since a last frame display or frame flip, If so, display said frame;
set said prev flip time to a new current time;
increment a queue pointer to point to a new next frame.

15. The apparatus of claim 14 wherein said hold time is configurable.

16. The apparatus of claim 15 wherein said hold time is dynamically configurable.

17. The apparatus of claim 14 wherein said renderer to prevent a predetermined time period from being exceeded between the display of successive frames.

18. The apparatus of claim 14 wherein said renderer to make the hold time greater than one frame interval.

19. The apparatus of claim 14 wherein said decoder to receive an audio/video packetized stream, remove a header from said stream, and obtain presentation time stamps from said header and frames from said stream.

20. The apparatus of claim 19 wherein said decoder provides said presentation time stamps in said frames to said renderer together with an indication of time and indication of said time period.

21. The apparatus of claim 14 including a display coupled to said renderer.

* * * * *